(12) United States Patent
Chen et al.

(10) Patent No.: US 7,450,391 B2
(45) Date of Patent: Nov. 11, 2008

(54) COMPUTER FRONT BEZEL WITH MOVABLE COVER

(75) Inventors: Yun-Lung Chen, Shenzhen (CN); Lin Ding, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 303 days.

(21) Appl. No.: 11/306,462

(22) Filed: Dec. 29, 2005

(65) Prior Publication Data

US 2007/0153460 A1 Jul. 5, 2007

(51) Int. Cl.
*H05K 5/00* (2006.01)

(52) U.S. Cl. .................. 361/752; 361/683; 361/724

(58) Field of Classification Search .......... 361/683, 361/752, 790
See application file for complete search history.

(56) References Cited

U.S. PATENT DOCUMENTS

| | | | | |
|---|---|---|---|---|
| 5,495,389 A | * | 2/1996 | Dewitt et al. | 361/683 |
| 6,961,246 B2 | * | 11/2005 | Dickey et al. | 361/724 |

FOREIGN PATENT DOCUMENTS

CN 03218381.X 8/2004

* cited by examiner

*Primary Examiner*—Dean A. Reichard
*Assistant Examiner*—Yuriy Semenenko
(74) *Attorney, Agent, or Firm*—Wei Te Chung

(57) ABSTRACT

A computer front bezel includes a bezel body (10), a cover (20) pivotably attached to the bezel body, and a connecting bar (30) connecting with the bezel body and the cover. The cover has an open position and a closed position. The connecting bar has first and second end portions. When the connecting bar is located in the first position, the cover is supported by the connecting bar, and lies in the open position, and when the connecting bar is located in the second position, the cover lies in the closed position.

16 Claims, 5 Drawing Sheets

COMPUTER FRONT BEZEL WITH MOVABLE COVER

FIELD OF THE INVENTION

The present invention relates to computer front bezels, and more particularly to a front bezel of a computer enclosure having a cover for external connection ports, such as USB (Universal Serial Bus) ports.

DESCRIPTION OF RELATED ART

Nowadays, some USB ports, such as earphone ports, microphone ports, flash memory ports and so on, are usually arranged on fronts of computer enclosures for convenient use. In order to prevent dust from blocking the USB ports and for decorative purpose, USB covers are used on the enclosures.

A typical front bezel defines a rectangular concave. A plurality of USB ports is disposed in the rectangular concave. A USB cover is often used to cover the rectangular concave, and slides on an inner surface of the front bezel. A pair of springs is disposed on the inner surface of the front bezel, and connects with the USB cover. A rack is disposed on an inner surface of the USB cover. A gear is disposed on the front bezel for engaging with the rack of the USB cover, thereby slowing the USB cover to protect the USB cover from impacting with the front bezel too strongly. When the USB cover is pressed to disengage from the front bezel, the springs cause the USB cover to slide open on the front bezel revealing the USB ports. When the USB cover is closed to engage with the front bezel, the USB ports are covered again. In the above computer enclosure, although the USB cover is convenient to operate it has a complicated structure and is expensive to manufacture.

What is needed, therefore, is a computer front bezel having a movable cover with a simple structure.

SUMMARY OF INVENTION

A computer front bezel includes a bezel body, a cover pivotably attached to the bezel body, and a connecting bar connecting with the bezel body and the cover. The cover has an open position and a closed position. The connecting bar has first and second end portions. When the connecting bar is located in the first position, the cover is supported by the connecting bar, and lies in the open position, and when the connecting bar is located in the second position, the cover lies in the closed position.

Other advantages and novel features will be drawn from the following detailed description of preferred embodiments with attached drawings, in which:

DETAILED DESCRIPTION

Figure 1:
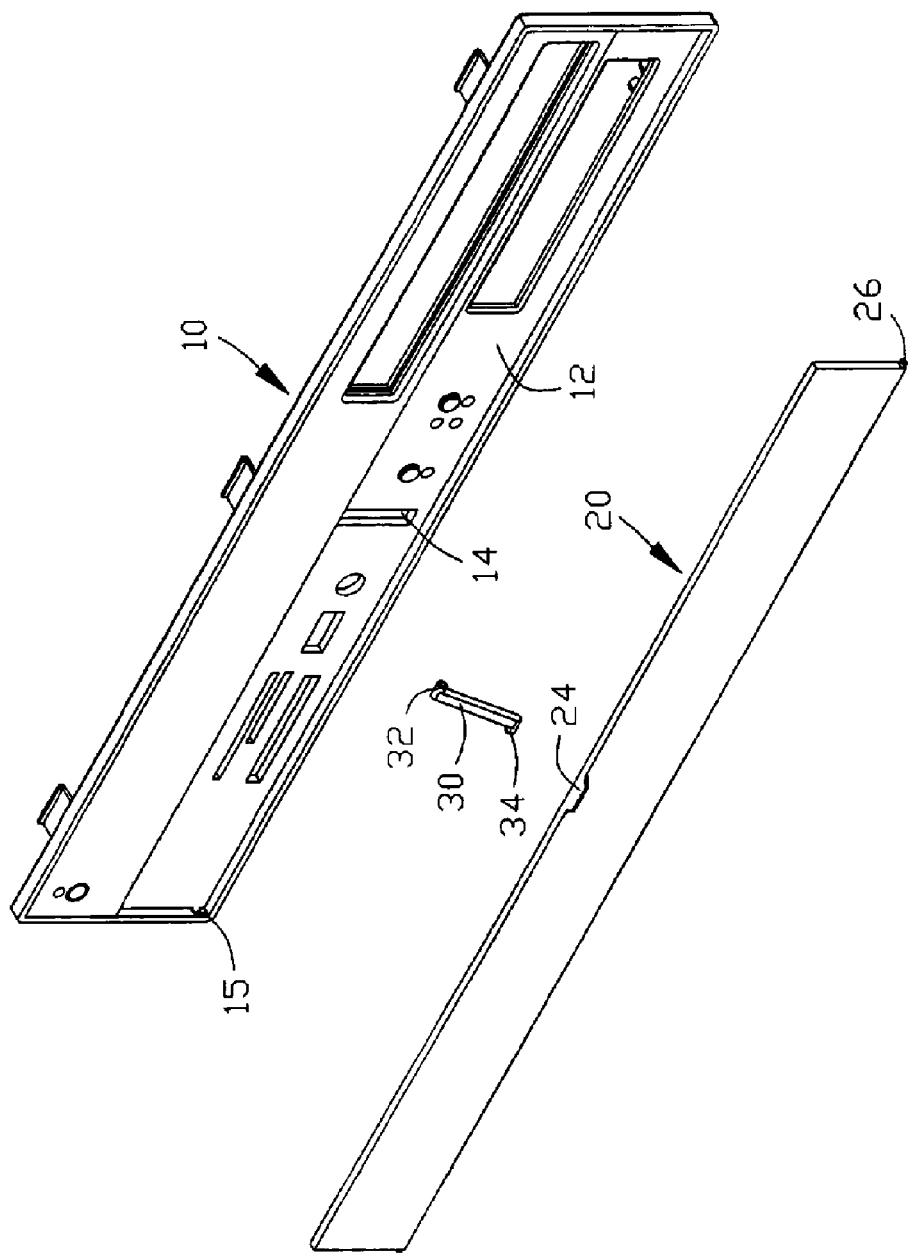
FIG. 1 is an exploded, isometric view of a computer front bezel in accordance with a preferred embodiment of the present invention, the computer front bezel including a bezel body, and a USB cover.

Referring to FIG. 1, a computer front bezel is for being installed on a computer enclosure (not shown). The computer front bezel includes a bezel body 10, a USB cover 20 pivotably attached to the bezel body 10, and a connecting member, such as a connecting bar 30 in the preferred embodiment, connected between the bezel body 10 and the cover 20.

Figure 2:
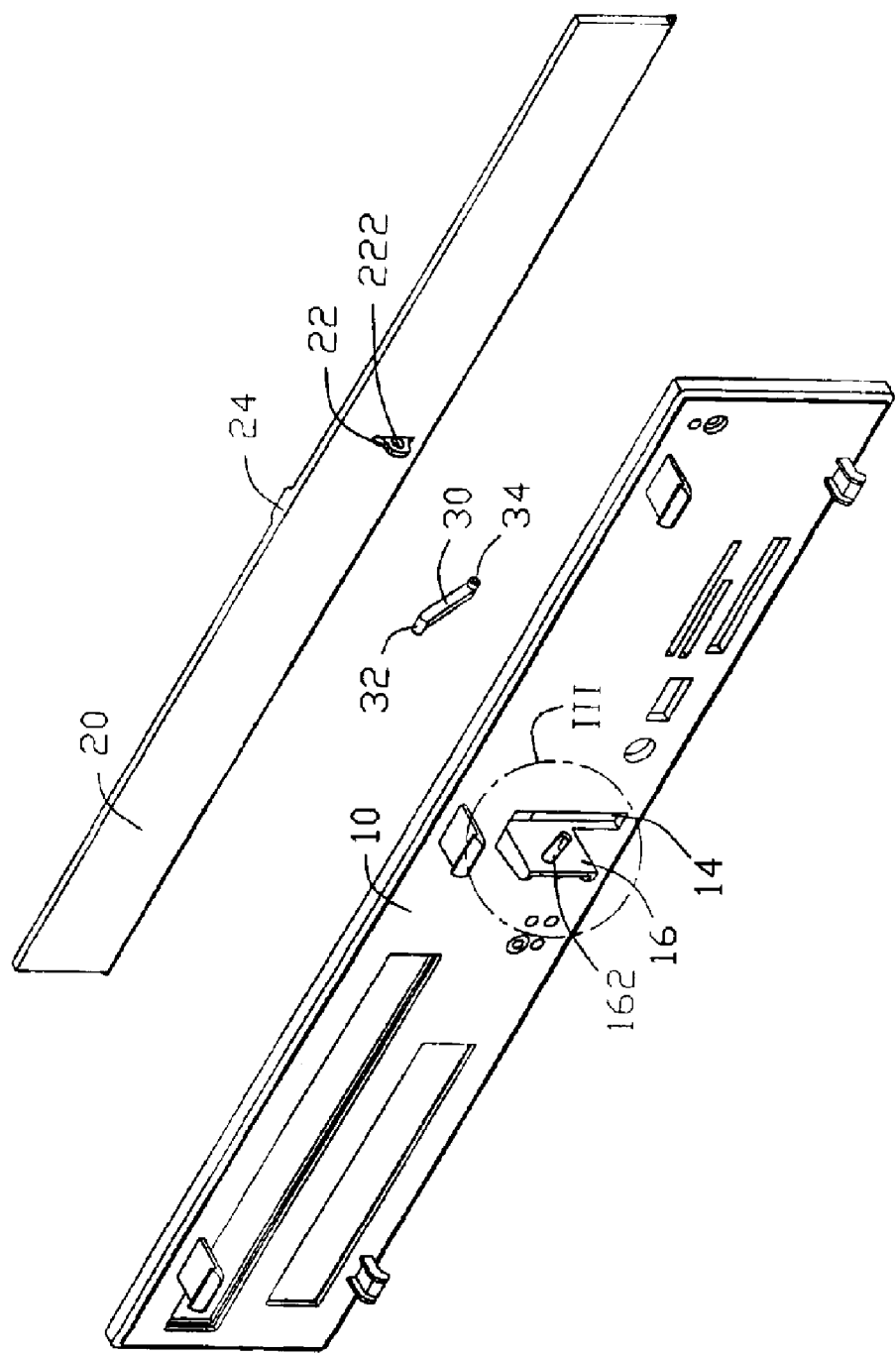
FIG. 2 is similar to FIG. 1, but viewed from another aspect.
Figure 3:
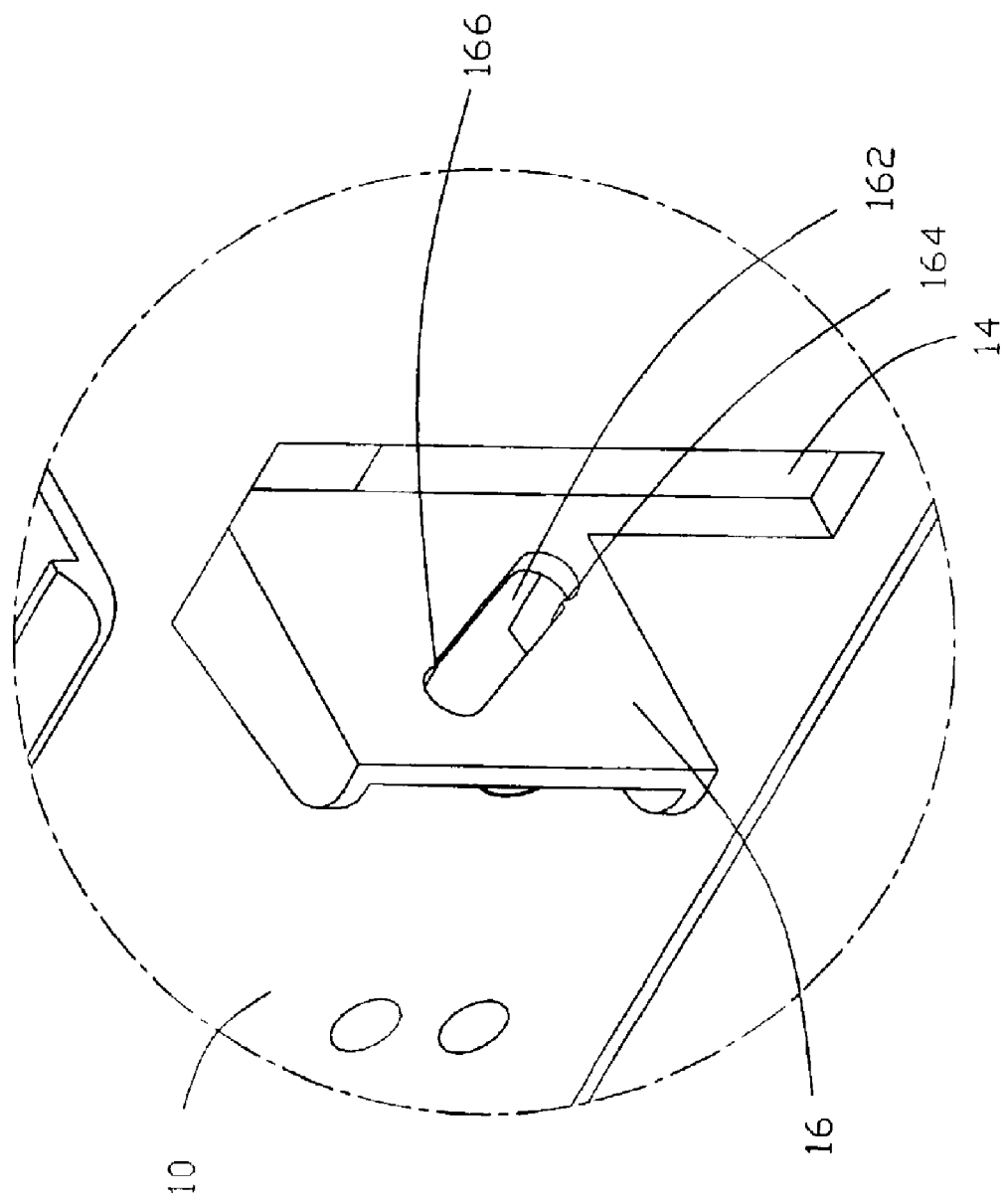
FIG. 3 is an enlarged view of circled portion III of FIG. 2.

Referring also to FIGS. 2 and 3, the bezel body 10 defines a generally rectangular concave 12 in a bottom portion of a front side thereof. A plurality of holes (not labeled) is defined in the concave 12, for receiving a plurality of USB ports (not shown) therein. A through opening 14 is defined in a generally middle portion of the concave 12, perpendicular to a length of the concave 12. A pair of pivot holes 15 (only one of the pivot holes 15 can be seen in FIG. 1) is defined in opposite ends of the bezel body 10 respectively, communicating with the concave 12. A positioning member, such as a projecting clip 16 in the preferred embodiment, extends rearward from the bezel body 10 at an extremity of the through opening 14. A guiding slot 162 is defined in the projecting clip 16, inclined to an extending direction of the projecting clip 16. The projecting clip 16 forms a positioning mechanism at the guiding slot 162. The positioning mechanism includes first and second protrusions 164, 166 formed on walls that bound the guiding slot 162 near opposite ends of the guiding slot 162 respectively, with the first and second protrusions 164, 166 being diagonally opposite to each other. The first protrusion 164 is adjacent to the bezel body 10, and the second first protrusion 166 is distant from the bezel body 10.

A pair of pivot pins 26 is formed on opposite ends of the USB cover 20 respectively, for pivotably extending into the pivot holes 15 of the bezel body 10 to thereby pivotably attach the cover 20 to the bezel body 10. A pivot portion 22 perpendicularly protrudes from a rear side of the USB cover 20, corresponding to the through opening 14 of the bezel body 10. A pivot hole 222 is defined in the pivot portion 22. An operating portion 24 is formed at a top edge of the USB cover 20, for opening and closing the USB cover 20.

The connecting bar 30 is for connecting with the bezel body 10 and the USB cover 20. The connecting bar 30 includes a pair of opposite end portions. The connecting bar 30 perpendicularly forms first and second posts 32, 34 respectively at the end portions thereof, corresponding to the guiding slot 162 of the bezel body 10, and the pivot hole 222 of the USB cover 20.

Figure 4:
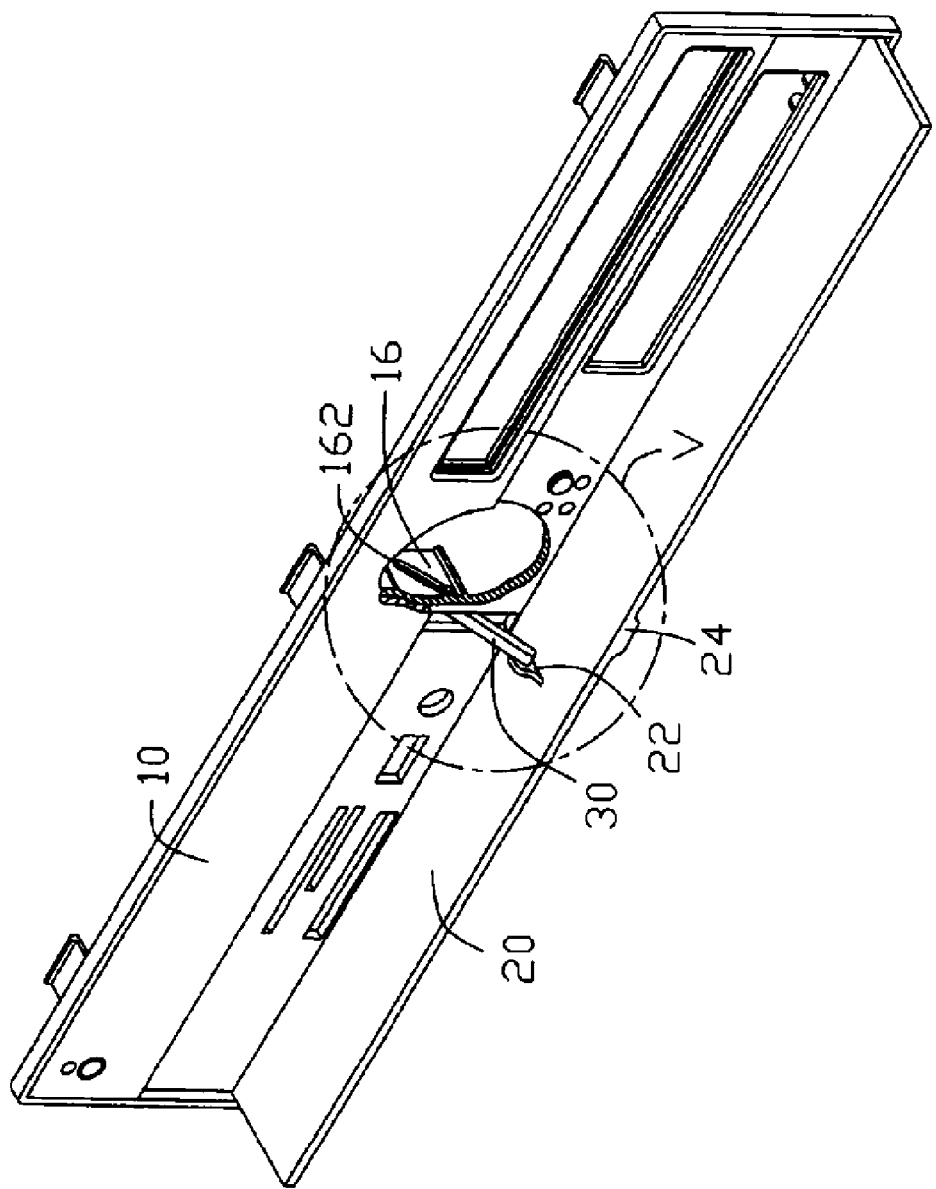
FIG. 4 is an assembled view of FIG. 1 with the bezel body being cutaway, showing the USB cover in an open position.
Figure 5:
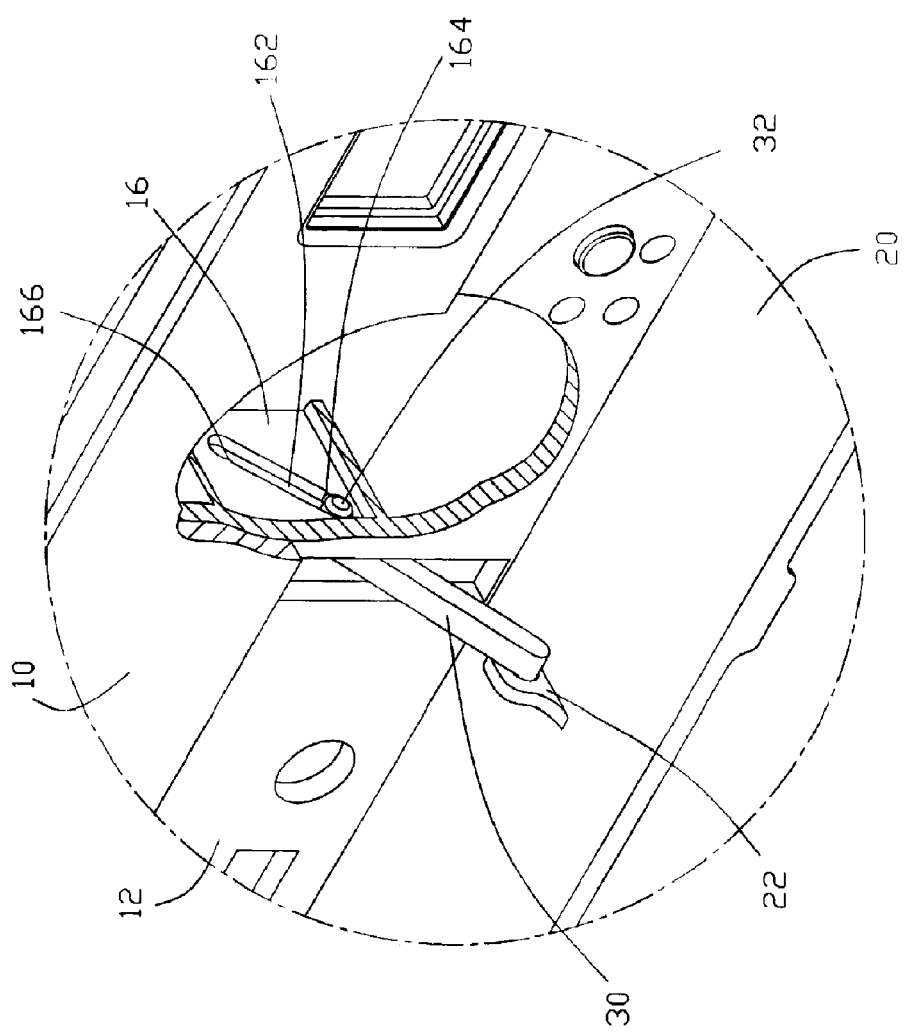
FIG. 5 is an enlarged view of circled portion V of FIG. 4.

Referring also to FIGS. 4 and 5, in assembly, the pivot pins 26 of the USB cover 20 are pivotably received into the pivot holes 15 of the bezel body 10 respectively. The USB cover 20 is thus pivotably attached to the bezel body 10. The first post 32 of the connecting bar 30 is inserted through the through opening 14 of the bezel body 10, and engaged into the guiding slot 162. The second post 34 of the connecting bar 30 is pivotably received into the pivot hole 22 of the USB cover 20. Thus, the USB cover 20 and the connecting bar 30 are secured to the bezel body 10.

In use, the USB cover 20 can be rotated up and down by operation of the operating portion 24. The connecting bar 30 pivots relative to the USB cover 20 and the bezel body 10. At the same time, the first post 32 of the connecting bar 30 slides in the guiding slot 162 of the bezel body 10. When the USB cover 20 is pivoted to an open position, the first post 32 slides to the end of the guiding slot 162 that is adjacent to the bezel body 10, and is positioned by the first protrusion 164, thus retaining the cover in the open position. At this time, the connecting bar 30 is in a first position. When the USB cover 20 is pivoted to a closed position, the first post 32 slides to the other end of the guiding slot 162 that is distant from the bezel body 10, and is positioned by the second protrusion 166, thereby retaining the cover 20 in the closed position. At this time, the connecting bar 30 is in a second position.

In alternative embodiments, the projecting clip 16 can be disposed on the cover 20, and the pivot portion 22 is correspondingly disposed on the bezel body 10.

Though the present technology has been described, taking the USB cover as an example, one skilled in the art should understand the present technology has other applications in structures that need to be open and closed.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer front bezel, comprising:
   a bezel body;
   a cover pivotably secured to the bezel body; and
   a connecting bar having first and second end portions, the first end portion slidingly engaging with one of the bezel body and the cover, and the second end portion pivotably engaging with the other of the bezel body and the cover;
   wherein the first end portion of the connecting bar is slidable on the one of the bezel body and the cover along a direction perpendicular to an axis about which the second end portion thereof is pivotable;
   wherein the one of the bezel body and the cover defines a guiding slot therein, for slidably receiving the first end portion of the connecting bar;
   wherein a projecting clip protrudes from the one of the bezel body and the cover, and the guiding slot is defined in the projecting clip inclined to an extending direction of the projecting clip.

2. The computer front bezel as described in claim 1, wherein a pivot portion is formed on the other of the bezel body and the cover, the pivot portion defines a pivot hole, the second end portion of the connecting bar forms a second post pivotably received in the pivot hole.

3. The computer front bezel as described in claim 1, wherein the one of the bezel body and the cover forms a pivot pin, and the other of the bezel body and the cover defines a pivot hole pivotably receiving the pivot pin therein.

4. The computer front bezel as described in claim 1, wherein the first end portion of the connecting bar forms a first post slidably engaged in the guiding slot.

5. The computer front bezel as described in claim 1, wherein the bezel body defines a through opening therein for the connecting bar inserting therethrough, and the projecting clip is formed at an extremity of the through opening.

6. The computer front bezel as described in claim 1, wherein first and second protrusions are formed on opposite end portions of a wall that bounds the guiding slot, respectively, and the first end portion is positioned by the protrusions when sliding to opposite end portions of the guiding slot.

7. The computer front bezel as described in claim 6, wherein the first and second protrusions are formed diagonally opposite to each other on the wall bounding the guiding slot.

8. A computer front bezel, comprising:
   a bezel body;
   a cover pivotably attached to the bezel body, the cover pivotable between an open position and a closed position;
   a projecting clip formed on the bezel body defining a guiding slot therein, the guiding slot having a first end nearest the bezel body and a second end farthest away from the bezel body; and
   a connecting bar having a first end portion slidingly engaged in the guiding slot of the projecting clip between the first end and the second end, and a second end portion pivotably connecting with the cover;
   wherein when the cover is pivoted from the open position to the closed position, the first end portion of the connecting bar is urged to slide from the first end to the second end of the guiding slot, and the second end portion thereof is pivoted on the cover.

9. The computer front bezel as described in claim 8, wherein the first and second portions have first and second posts thereon engaging with the bezel body and the cover, respectively.

10. The computer front bezel as described in claim 8, wherein the guiding slot of the projecting clip is inclined to the bezel body, and the projecting clip forms a positioning mechanism at edges of the guiding slot to position the first end portion in the first and second ends of the guiding slot.

11. The computer front bezel as described in claim 10, wherein the positioning mechanism comprises first and second protrusions formed on walls that bound the guiding slot respectively adjacent the first and second ends of the guiding slot.

12. The computer front bezel as described in claim 8, wherein the bezel body defines a concave therein, and the concave defines a through opening therein for the connecting bar inserting therethrough.

13. A front bezel for a computer enclosure, comprising:
    a bezel body defining a through opening therein and comprising a positioning member formed on a rear side of the bezel body;
    a cover pivotably attached to a front side of the bezel body opposite to the rear side thereof and being pivotable between an open position and a closed position; and
    a connecting member inserted into the through opening of the bezel body and having a first end portion, which lies on the rear side of the bezel body and connects to the positioning member, and a second end portion which lies on the front side of the bezel body and pivotably connects to the cover, the engagement between the positioning member and the first end portion of the connecting member being configured for allowing the cover to he positioned in the open and closed positions;
    wherein the positioning member comprises a projecting clip formed adjacent the through opening, the projecting clip defines a guiding slot therein, inclined to an extending direction of the projecting clip, and the first end portion of the connecting member is slidably received in the guiding slot of the projecting clip.

14. The front bezel as described in claim 13, wherein the bezel defines a concave in the front side thereof, and the cover is pivotable to cover the concave in the closed position and expose the concave in the open position.

15. The front bezel as described in claim 13, wherein first and second protrusions are formed on opposite end portions of a wall that bounds the guiding slot respectively, and respectively engage with the first end portion of the connecting member to position the cover in the open and closed positions.

16. The front bezel as described in claim 15, wherein the second end portion of the connecting member is pivotably connected with the cover.

* * * * *